(No Model.)

W. R. SMITH.
COIN CONTROLLED WEIGHING SCALES.

No. 441,711. Patented Dec. 2, 1890.

Witnesses
Wm L Shrider
Albert Shriden

Inventor
William R. Smith
By his Attorney Woodbury Lowery

THE NORRIS PETERS CO., PHOTO-LITHO., WASHINGTON, D. C.

UNITED STATES PATENT OFFICE.

WILLIAM ROBERT SMITH, OF NEW YORK, N. Y., ASSIGNOR TO THE STANDARD AUTOMATIC SCALE COMPANY, OF SAME PLACE.

COIN-CONTROLLED WEIGHING-SCALES.

SPECIFICATION forming part of Letters Patent No. 441,711, dated December 2, 1890.

Application filed December 12, 1889. Serial No. 333,443. (No model.)

*To all whom it may concern:*

Be it known that I, WILLIAM ROBERT SMITH, a citizen of the United States, residing at New York, in the county and State of New York, have invented new and useful Improvements in Coin-Controlled Weighing-Scales, of which the following is a specification.

My invention consists in a novel indicating device for a coin-operated weighing-scale, in which a revolving dial-wheel having figures upon its tread or periphery is actuated by the weighing mechanism, and on the introduction of a coin into the coin-chute an index or pointer is caused to point to the proper weight on the tread of the dial-wheel.

My invention consists, further, in a device for preventing the shock given the indicating mechanism by any sudden movement imparted to the rack-bar by the tension of the weighing-spring.

In the accompanying drawings I have shown my improvements applied to a coin-operated weighing-scale of the class described in Letters Patent No. 365,353, granted Smith and Washburn, June 21, 1887, in which the rack-bar is independent; but I do not limit myself to their use in such a machine, as the indicating device may be used in all rack-bar-actuated weighing-scales, whether said bar is rigidly attached or not to the weighing mechanism, and the shock-preventing device may be used in all weighing-scales in which one end of the rack-bar abuts against the weighing mechanism either in its rise or its fall.

Figure 1:
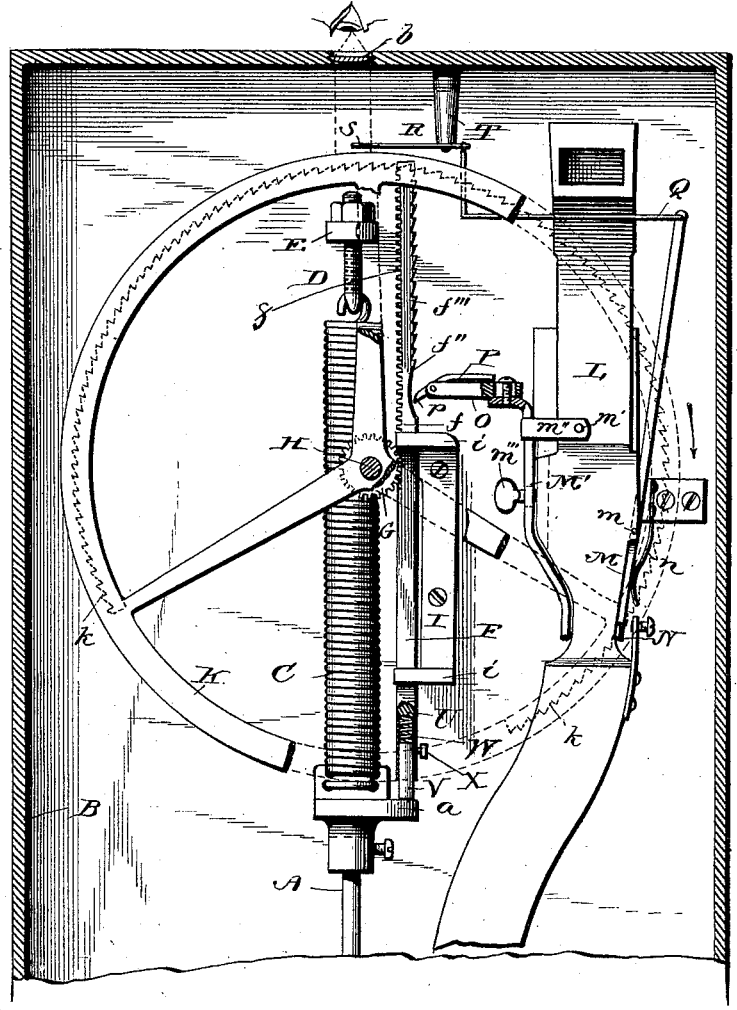
Figure 2:
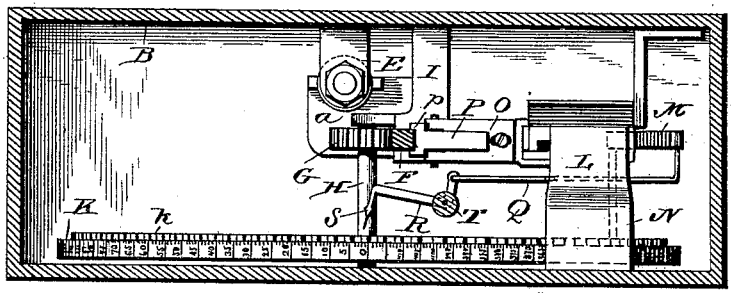

In the accompanying drawings, which illustrate my invention, Figure 1 is a front elevation of so much of a weighing-scale with the front of the case removed as is necessary to show the improved indicating mechanism, and Fig. 2 is a top view of the same with the top of the case removed.

A is a rod, to the lower end of which the lever of the platform-scales is attached. It is suspended from the frame or case B by a spring C and rod D, secured to a bracket E, fastened to the back of the case B.

$a$ is a stop on the lever-rod A, against which the independent rack-bar F abuts. The rack-bar F slides vertically in bearings $i\,i$ on the back-plate I, and is provided with teeth $f$, which engage with a pinion G, mounted on the dial-shaft H, carrying the revolving dial-wheel K. The tread or periphery of the revolving dial-wheel K has affixed to it the usual numbers or symbols, and the dial-wheel itself is mounted upon the shaft H in such a relation to the rack-bar F that the descent of the latter, when released, will turn the pinion G, the dial-shaft H, and the dial-wheel K, causing the latter to bring the proper number under the aperture $b$ in the top of the case B.

L is a coin-chute having two pivoted sides M and M', forming in their normal position a receptacle of only sufficient dimensions to retain the coin. Side M is pivoted at $m$ to the chute L, and carries at its lower end a latch-bar N, as indicated in dotted lines in Fig. 2, which engages with the teeth $k$ on the dial-wheel K, locking it when the wheel turns in the direction of the arrow, but passing freely over them when the revolution is reversed. A spring $n$, attached to the chute, holds side M in its normal relation to side M' and the latch N normally in engagement with the teeth $k$. The upper end of the side M is prolonged and connected by a bar Q to one end of a bell-crank R, to the other end of which is attached the pointer S. The bell-crank R is supported by a standard T, and is so located with respect to the dial-wheel K that the forward movement of the bell-crank, caused by the backward movement of the latch N and its end of side M, thrusts the pointer S over the number indicating the weight, whereupon the pointer is seen through aperture $b$, indicating the proper weight. The other side M' of the chute L is also pivoted at $m'$ by means of a lug $m''$, secured near its upper extremity, which has a fork-shaped extension O, between the prongs of which is pivoted a weighted lever P, the end $p$ of which rests, in its normal position, in the notch $f''$ in rack-bar F, but is arranged to tip up and yield to the teeth $f'''$ in the rack-bar on the descent of the latter and to engage with them on the ascent of the rack-bar. The locking of the weighted lever and teeth $f'''$ on the ascent of the latter tilts outwardly one side M' of the chute on its pivot $m'$, and thus increases the space between the sides M and M'. A set-screw $m'''$, which passes through a slot in the side M' and fastens into the prolongation of the neck of the chute, limits the outward throw of side M′, on reaching which the weighted lever yields to the ascent of the rack.

The operation of this part of my invention is as follows: The mechanism being in the normal position shown in Fig. 1, on placing a weight upon the platform of the scales the rod A descends, but the rack-bar F remains in its place, being locked by the latch N, which by engaging with the teeth on the dial prevents its revolution, as well as that of the pinion G and the consequent fall of the rack. The weight is next indicated by introducing a coin into the chute L, which in its fall, pushes back the side M against the spring $n$, and thus withdraws the latch N and allows the rack-bar F to fall until it abuts against the stop $a$. Rack-bar F in its fall turns the pinion G, and with it the dial-shaft H and dial-wheel K, until the proper number is brought opposite the pointer S, while simultaneously with the backward movement of the latch N the side M of chute L is moved, causing its upper extremity to thrust forward the pointer S over the number on the dial by actuating the bell-crank R through connecting-rod Q, so that both number and pointer are seen through the aperture $b$.

In order to prevent the shock to the indicating mechanism, due to any sudden movement of the rack-bar F, the latter is recessed at its lower end U and a pin V inserted with an interposed spring W. A thumb-screw X in the end of the rack engaging in a slot extending part of the length of the pin V prevents the falling out of the latter, while allowing it sufficient play against the spring to take up any sudden concussion.

Having thus described my invention, what I claim as new, and desire to secure by Letters Patent, is—

1. In a coin-operated indicating device, the combination, with the rack-bar actuating the dial-wheel, of a revolving dial-wheel having symbols on its tread or periphery, a coin-chute having a movable side, a pointer, and suitable connections between said pointer and movable side, whereby on the introduction of a coin into the chute the pointer is caused to project over the dial-wheel, substantially as and for the purpose set forth.

2. In a coin-operated indicating device, the combination, with the rack-bar actuating the dial-wheel, of a revolving dial-wheel having symbols on its tread or periphery, a coin-chute having a movable side, a pointer, suitable connections between said pointer and movable side, and an inclosing-case having an aperture, whereby on the introduction of a coin into the chute the pointer is caused to project over the dial and under the aperture, substantially as described.

3. In a coin-operated indicating device, the combination, with the rack-bar actuating the dial-wheel, of a revolving dial-wheel having symbols on its periphery, a coin-chute, and a pointer and a latch, both actuated by said coin-chute, whereby on the introduction of a coin into said chute the latch is withdrawn from locking the rack, allowing the dial-wheel to revolve, and the pointer is projected over said dial-wheel, substantially as described.

4. The combination, with the rack-bar F, actuating the dial-wheel of an indicating mechanism, of the dial-wheel K, its shaft H, pinion G, gearing with said rack, and the coin-chute L, having the pivoted side M, the arm Q, the standard T, and the bell-crank and pointer R S, whereby on the insertion of a coin into the chute and the movement of the rack-bar the dial-wheel is revolved and the pointer projected over it.

5. The combination, with the rack-bar F, actuating the dial-wheel of an indicating mechanism, of the dial-wheel K, having the locking-teeth $k$, its shaft H, pinion G, gearing with said rack, and the coin-chute L, having the pivoted side M, the latch N, secured to one extremity of said side and engaging with the teeth on the dial-wheel, the arm Q, the standard T, and the bell-crank and pointer R S, whereby on the insertion of a coin into the chute the dial-wheel is released so as to revolve under the action of the rack-bar, and the pointer is projected over the dial-wheel, substantially as described.

6. The combination of the coin-chute L, having the pivoted side M and the arm Q, the bell-crank R, the pointer S, and the standard T, whereby on the movement of the pivoted side the pointer is thrust forward and withdrawn.

7. In a coin-operated weighing-scale, the combination, with the weighing mechanism, of a revolving dial having symbols on its tread and teeth on its rim, a coin-operated latch engaging with said teeth, whereby the dial is locked and released, and an inclosing-case having a vertical aperture through which the dial is seen, substantially as and for the purpose set forth.

In testimony whereof I have hereunto set my hand in the presence of two subscribing witnesses.

WILLIAM ROBERT SMITH.

Witnesses:
H. A. B. KELLY,
O. F. HIBBARD.